Figure 1:
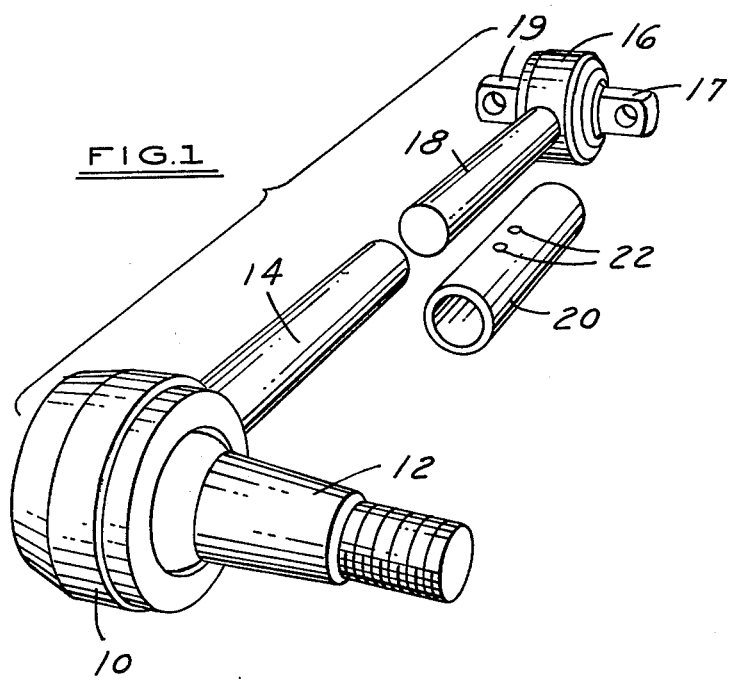

United States Patent [19]

Gaines et al.

[11] 4,189,249
[45] Feb. 19, 1980

[54] REPLACEMENT TORQUE ROD ASSEMBLY

[75] Inventors: Donald R. Gaines, Farmington; Jon M. Smallegan, Farmington Hills; William H. Trudeau, Brighton, all of Mich.

[73] Assignee: Gulf & Western Manufacturing Company, Southfield, Mich.

[21] Appl. No.: 945,093

[22] Filed: Sep. 22, 1978

Related U.S. Application Data

[63] Continuation of Ser. No. 787,667, Apr. 15, 1977, abandoned.

[51] Int. Cl.² .................... B25G 3/00; F16D 1/00; F16G 11/00
[52] U.S. Cl. .................................. 403/27; 403/272; 403/305; 280/95 R; 228/178; 403/76
[58] Field of Search ............... 403/272, 271, 268, 305, 403/300, 27, 56, 66, 76; 228/165, 178; 280/93, 95 R, 95 A

[56] References Cited

U.S. PATENT DOCUMENTS

| 1,293,872 | 2/1919 | Murray | 228/165 UX |
|---|---|---|---|
| 2,144,162 | 1/1939 | Leighton | 280/95 R |
| 2,685,462 | 8/1954 | LöFqvist | 403/300 X |
| 3,013,437 | 12/1961 | Harding | 280/95 R X |
| 3,109,668 | 11/1963 | Sampietro | 280/95 R X |
| 3,969,032 | 7/1976 | Wolicki | 403/271 X |

Primary Examiner—Wayne L. Shedd
Attorney, Agent, or Firm—Barnes, Kisselle, Raisch & Choate

[57] ABSTRACT

A replacement torque rod assembly for field and maintenance installation which includes ball joint assemblies, each having a housing rod extending therefrom to position in butting relation after being cut to a dimension to span a predetermined distance for assembly and a telescoping sleeve overlying the abutting ends and welded to said ends to provide a rigid torque rod for field installation.

2 Claims, 4 Drawing Figures

REPLACEMENT TORQUE ROD ASSEMBLY

This is a continuation of application Ser. No. 787,667, filed Apr. 15, 1977, now abandoned.

This invention relates to a Replacement Torque Rod Assembly and more particularly to a system utilizing parts which can be assembled to provide replacement parts suitable for multiple adaptations in the motor vehicle field.

Reference is made to a copending application of Joseph E. Smith, Jr. on a Calibrated Replacement Torque Rod, Ser. No. 848,944, filed Nov. 7, 1977, and assigned to a common assignee.

Torque rod assemblies for motor vehicles consist of a bar or a rod of predetermined length terminating at each end in a ball and socket joint which may contain a single ball stud or what is sometimes called a straddle ball with a stud projecting from each end of the joint. These torque rods are used on most vehicles and come as original equipment in predetermined lengths which may vary from vehicle to vehicle and model to model.

The torque rods are usually manufactured by assembling a ball stud and extension rod in a fixture and spin welding the two together, thus connecting the housings of the two ball socket joints. The single or double ended ball studs extend generally transverse to the rod which connects the two housings.

After a vehicle has been in use, it is sometimes necessary to replace these torque rod assemblies either because of breakage or because of some exceptional wear which has reduced the effectiveness of one of the joints.

Because of the varying lengths, it is sometimes difficult for garages and other maintenance stations to stock all of the parts which would be required for an adequate replacement service. Since the ball studs are assembled on the rod in a more or less permanent relationship, it is not possible to stock only the rods and assemble the ball studs and joints thereon. Thus, the present invention is directed to provide an assembly of parts which enables a repairman to provide a proper torque rod assembly for a replacement in the proper length, depending on the particular requirements of the vehicle needing to be repaired.

Briefly, this invention involves the preparation of two ball joint assemblies, each with a rod extension which is spun welded on to the housing shank, these to be joined end-to-end in a telescoping sleeve connection after a proper dimensioning has been achieved by cutting the single shanks or rods to a proper length to achieve the span dimension required.

Other objects and features of the invention relating to details of construction will be apparent in the following description of the invention setting forth the details which enable a person skilled in the art to practice the invention, all in connection with the best mode presently contemplated for the invention.

Drawings accompany the disclosure and the various views thereof may be briefly described as:

FIG. 1, a perspective view of the parts of the assembly.

Figure 2:
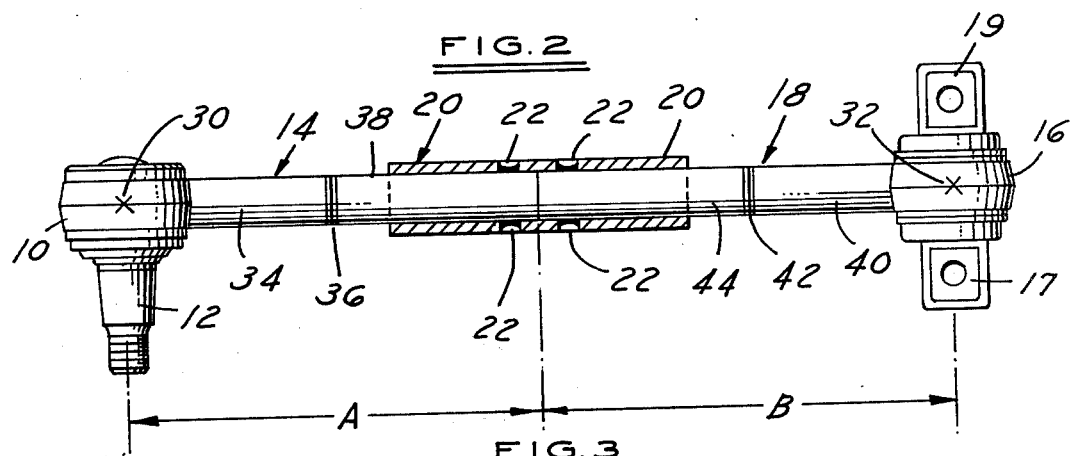

FIG. 2, a side elevation, partly in section, illustrating the manner in which the parts are joined.

Figure 3:
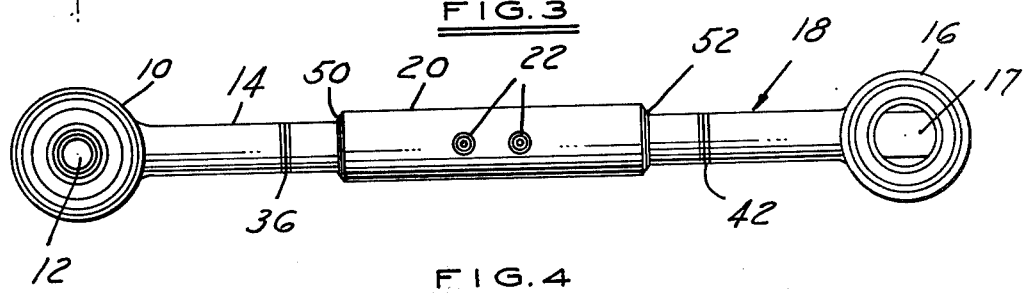

FIG. 3, a top view of the parts which are permanently joined for assembly in a vehicle.

Figure 4:
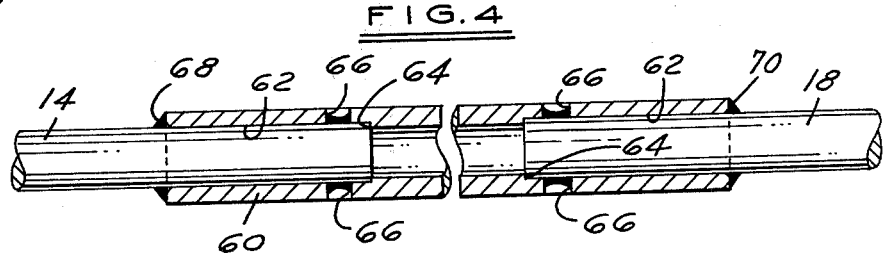

FIG. 4, a sectional view of a modified construction.

REFERRING TO THE DRAWINGS

A first ball joint 10 is shown having a ball stud 12 extending from one open end thereof and with a rod 14 extending radially from the ball joint housing. At the other end of the assembly is a ball joint housing 16, in this case containing a straddle ball joint with two ends 17 and 19, the ball joint housing 16 having a rod 18 extending therefrom. A connector tube 20 is shown beside the parts having holes 22 drilled therein from both sides.

In FIG. 2, a top view of the unit is shown. Each ball has an indicia mark 30 and 32, respectively, at the center of the ball assembly. The shaft 14 is composed of a stud portion 34 which has been spun weld at 36 to a rod 38. The shaft 18 has a stud portion 40 spun weld at 42 to an extension rod 44. Prior to the assembly of the tubular element 20, the shaft 14 and the shaft 18 are cut to the dimensions A and B, each of which is approximately one-half the total distance required between the center points 30 and 32 to span the necessary distance for a particular vehicle replacement. Once these portions have been cut to the proper length, they are telescoped into the close tolerance tube 20 which has the spaced openings 22 near the center which permit visual location of the butting ends of the shafts 14 and 18 approximately at the center of the tube 20.

The ends of the tube then are welded at 50 and 52 and provide an annular weld around the tube and the shaft which is inserted into it. A puddle weld is formed in each of the holes to lock the parts securely together. Thus, the complete assembly fully welded is shown in FIG. 3 readily for installation as a replacement part into a particular vehicle.

It will be seen that the invention thus reduces greatly the inventory needed at maintenance stations or garages for replacing the torque rods. The invention also permits the versatility of joining a single ball joint stud as shown at the left of FIG. 2 to a straddle ball joint as shown at the right-hand end. Various assemblies and combinations can be put together in this way with the proper span distance between the ball joint centers.

In FIG. 4, a modified construction is shown for heavy duty applications in which a tube 60 is utilized having a controlled inner diameter 62 at each end terminating in an annular shoulder 64. Holes 66 are provided for the puddle welds. The shafts 14 and 18 insert into the ends up to the shoulders and are welded at 68 and 70 as previously described. The holes 66 provide visibility in assembly and also a location for a puddle weld. The tube 60 is preferably about 18 inches in length with the controlled recesses at each end being 4 inches in length. The initial embodiments with a 30" length will cover about 85% to 90% of the field requirements, while the embodiment of FIG. 4 with a 40" length will cover the remaining field requirements.

What is claimed as new is:

1. A fixed dimension replacement rod assembly for field replacement in vehicles which comprises:
    (a) a first movable joint having a first containing body and a fastening means extending axially therefrom movable relative to the body and a first elongate solid member permanently secured to and extending radially from the containing body,
    (b) a second movable joint having a second containing body and a fastening means extending axially therefrom movable relative to the body and a second elongate solid member permanently secured to and extending radially from the second containing body, (c) a third elongate tubular member having at opposite ends a telescoping slidable fit with each of said first and second elongate members, the third member comprising an outer member of the telescoping parts encircling first and second elongate members which comprise inner members, the outer member having radial openings spaced from the ends thereof, and (d) circular welds around the ends of the encircling outer member of the telescoping members joining the outer member to said inner members and puddle welds in said radial openings joining said outer member to said inner member to provide a torque rod of fixed dimension for installation in a prescribed position in a vehicle.

2. A fixed dimension replacement rod assembly for field replacement in vehicles as defined in claim 1 in which is provided means forming externally visible center-point indicia on each said first and second containing bodies to provide anchor points to facilitate measuring and assembly of said torque rod to a predetermined lineal dimension.

* * * * *